Figure 1:
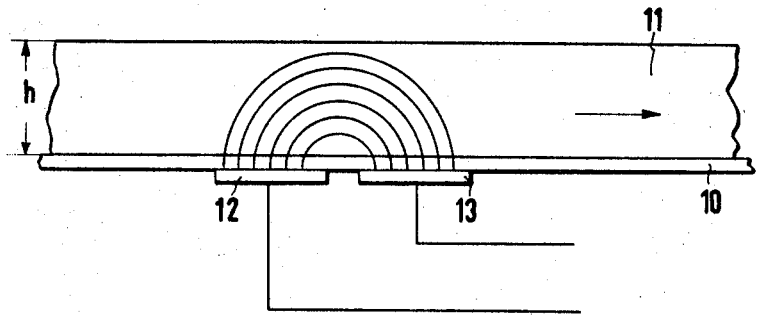

United States Patent

[11] 3,600,676

[72] Inventors Rainer Wolfgang Lugwig
Stuttgart-Feuerbach;
Herwig Max Jungmichel, Wilferdingen,
both of, Germany
[21] Appl. No. 809,353
[22] Filed Mar. 21, 1969
[45] Patented Aug. 17, 1971
[73] Assignee **Horst Nauditt Roland Sirenenbau-
Electronic-schiffbau**
Noettingen, Germany

[54] MOISTURE METER UTILIZING AMPLITUDE AND BANDWIDTH SIGNALS
6 Claims, 4 Drawing Figs.
[52] U.S. Cl. ..................................................... 324/61 R
[51] Int. Cl. ....................................................... G01r 27/26
[50] Field of Search .......................................... 324/61;
73/73; 235/151.3

[56] References Cited
UNITED STATES PATENTS
2,542,372 2/1951 Taylor et al. ................... 324/61
3,155,900 11/1964 Hanken ........................ 324/61
3,464,005 8/1969 Wood .......................... 324/59 X
FOREIGN PATENTS
1,063,515 3/1967 Great Britain ................ 324/61

*Primary Examiner*—Edward E. Kubasiewicz
*Attorney*—Laurence R. Brown

ABSTRACT: There is disclosed a meter for measuring on a continuous basis the moisture content of a moving layer of bulk materials such as coal or wood chips. A capacitor has two plates on one side to span a portion of the conveyed bulk material with its field. This capacitor is connected in a resonant circuit which is frequency modulated with a sawtooth modulation wave varying about a particular center frequency which is predetermined for the dielectric constant provided to the capacitor by a known bulk material. Then the amplitude and bandwidth of the resonant circuit frequency response is a function of the moisture content and quantity of bulk material in the capacitor field. An analog computer then takes a ratio to produce a direct reading as a percentage of moisture content.

INVENTORS
Rainer Wolfgang Ludwig & Herwig Max Jungmichel
BY
Lawrence R. Brown
Attorney

MOISTURE METER UTILIZING AMPLITUDE AND BANDWIDTH SIGNALS

This invention relates to methods and apparatus for continuous measurement of the moisture of transported bulk materials.

It is simpler to measure the water content of stationary goods. For a continuous measurement a dielectric method of measurement is especially suitable, and it is customary in this respect to require a relative dielectric constant value of the stationary goods lying between one and 10 compared with that of water which has a dielectric constant value of 80. Heretofore a capacitor has been used with plates over and under a conveyor for the goods under investigation such as a conveyance belt carrying bulk materials. The mater being conveyed, for example bulk materials, then acts as the dielectric for the capacitor. In this capacitance equipment the circuit operation is limited. For example, the static component of current is observed as the voltage is held constant. When the dielectric constant changes, so also does the static current component change. Generally, the capacitive reactance changes are limited in magnitude by the requirement to hold constant the voltage and frequency. The current is then a measure of the dielectric constant and thereby indicates the moisture content of the goods under observation.

The aforementioned measuring technique requires a constant thickness of the goods under observation. This restriction may be acceptable in measuring moving yarn for example, but is not acceptable when measuring bulk goods. Thus, the position of the capacitor plates has been changed to place the plates alongside each other in a so-called distributed field capacitor configuration, thereby to remove concern over the capacitor plate spacing, so that the capacitor field is not responsive to very small changes of density of the goods under measurement. Thus, the response of the measurement to the layer thickness of the goods under measurement is resolved by this method, but the measurement is still dependent upon the density of the goods. For many kinds of bulk goods, such as coal, the problem may be resolved, but for other kinds of goods there is still a strong dependency upon the density of the bulk goods layer under observation. So it may be shown by wood chips for example that the density depends strongly upon the thickness of the layer, and the expected accuracy of the measure of moisture in the prior art methods is limited.

An object of the invention is to provide a method for dielectric measurement of the moisture content of bulk goods that permits the continuous measurement when the thickness of the bulk good layer under observation changes, without making the measurement dependent upon the thickness.

Another object of the invention is to provide apparatus for carrying out this aforesaid method.

In accordance with the invention the foregoing problems are corrected. Thus, measurements of the contained moisture in the observed goods are determined by the static losses in the capacitor, while at the same time the quantity of the goods being observed is determined from the dynamic losses of the capacitor. Accordingly, the percentage of moisture in the observed goods is found from the ratio of the two values.

Also in accordance with the invention it is recognized that the static loss of the capacitor singly and by itself indicates the moisture content of the goods under investigation. On the other hand the dynamic loss of the capacitor singly and by itself is influenced by the bulk material magnitude presented in the capacitor field. The latter is explained by the orientation of the permanent molecular dipoles of the goods being influenced in rhythm with the frequency applied to the capacitor. By finding the value of the static and dynamic losses it becomes possible to determine the ratio of the moisture residing in the measuring zone to the quantity of bulk goods found in the measuring zone, thereby to determine the percentage of moisture in the bulk goods.

Preferably in accordance with the foregoing invention, a measuring capacitor is part of a parallel resonant circuit that is frequency modulated, and the measured moisture content in the goods causes a resonant frequency within a scanning frequency spectrum of the frequency modulation spectrum in such a manner that the quantity of the measured goods is proportional to the amplitude of the resonant circuit output signal. In other words the measurement of the moisture content relates to the tuning of resonance in the tank circuit and the amplitude of the current relates to the quantity of bulk goods being measured. Both values can then be produced as concurrent electrical signals.

A specially suited apparatus for practicing the invention is exemplified by an inductor and a measuring capacitor in a parallel resonant tank circuit, with the tank circuit driven with a frequency modulated signal presenting a sawtooth waveform modulation pattern. An analog computer processes two input signals, one derived from the resonant frequency of the tank circuit and the other derived from the amplitude change response of the tank circuit. In this manner it is then possible to determine directly the percentage of moisture content of a bulk material being measured independent of variations of the thickness of the bulk material.

Figure 2:
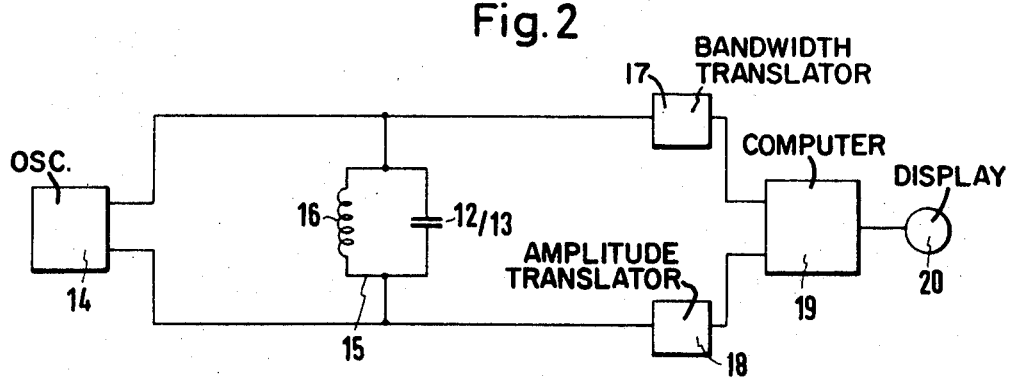
Figure 3A:
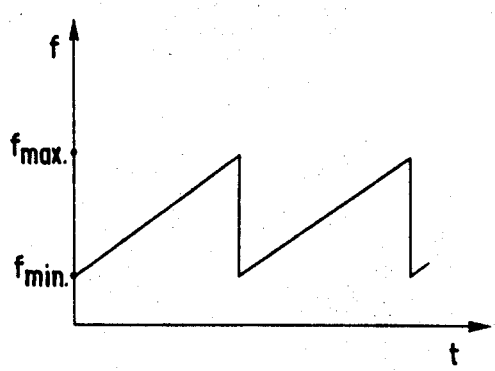
Figure 3B:
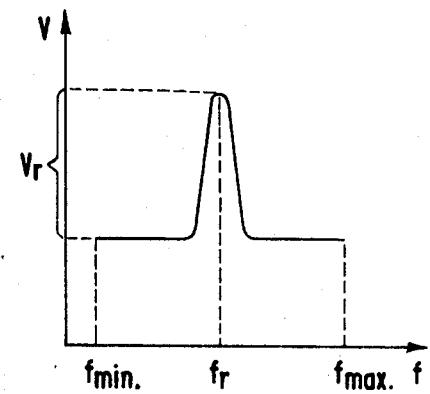

Other features, objects and examples of the invention are found in the following description, drawings and claims. An embodiment of the invention is shown in the drawing, wherein:

FIG. 1 is an elevation view of a distributed field condenser for measuring the moisture of bulk materials, FIG. 2 is a block diagram of a circuit arrangement afforded by the invention, and FIGS. 3a and 3b are waveform diagrams explaining the operation of the invention.

FIG. 1 shows schematically conventional apparatus for continually measuring moisture of bulk goods. On a conveyance belt 10 is a bulk material passing for example in the direction of the arrow. The height of the bulk material is denoted $h$. Underneath the conveyor 10 is placed a distributed field capacitor with two capacitor electrodes 12 and 13 arranged next to each other. When the capacitor 12/13 is connected in a current-producing circuit, then the current flowing through the capacitor is dependent upon the dielectric constant of the bulk goods 11, and accordingly upon the moisture content of those goods. With the assumption that the field pattern is constant within the bulk goods 11, and under the further assumption that the bulk goods density is independent from the height $h$, no changes appear in the measured results even if the height of the bulk goods were doubled, for example. However, the measured results change considerably when the moisture in the bulk goods 11 changes.

However, a large portion of the bulk goods of interest have a density dependent upon the height. For example, with wood chips a doubling of height $h$ causes a considerable increase of the wood chip density in the measuring zone of the capacitor, with the consequence that in the event the moisture content of the bulk goods is constant a changing measured result is obtained. This means however that the mere measurement of the current gives a doubtful indication of the moisture content because of the changing height of the bulk goods.

FIG. 2 shows a block diagram of an embodiment of the invention. A frequency-modulated oscillator 14 is shown with an output frequency periodically changed between the range $f_{min}$ and $f_{max}$, the frequency change being as shown in FIG. 3a of a sawtooth nature. The oscillator 14 drives a parallel resonant circuit 15, comprising the measuring capacitor 12/13 and an inductor 16. The output of the resonant circuit 15 passes through two signal translating circuits 17 and 18, which serve as amplifiers. The output of signal translation circuits 17 and 18 leads to an electronic analog calculator 19 whose output is connected with a reproducing device 20.

The frequency-modulated oscillator 14 is so adjusted that the resonant frequency of the tank circuit 15 is at the midfrequency of the modulation stroke. In other words, during each modulation stroke a resonance condition is passed somewhat as shown by the frequency $f_r$ in FIG. 3b. The amplitude at the frequency $f_r$, and also the position of resonance within the frequency spectrum, depends upon the dielectric constant of the dielectric of the capacitor 12/13, and accordingly upon the dielectric constant of the bulk goods 11 thereby being dependent upon its moisture content. Now the signal translation circuit 17 is so arranged that for each modulation stroke of oscillator 14 an impulse is derived with a height and width proportional to the position of the resonance frequency $f_r$ in the frequency spectrum, accordingly proportional to $f_r - f_{min}$ s compared with $f_{max} - f_r$. Then the signal pulse from the translator circuit 17 is passed to calculator 19 which provides from the signal representing the goods under measurement 11 a moisture content indication. Moreover, from the occurrence of the resonance a predetermined resonance amplitude of current, for example represented as voltage $V_r$ in FIG. 3b, whose value depends upon the quantity of the bulk goods in the measuring region. Because of the continued orientation of the molecular dipole in the capacitor dielectric in rhythm with the frequency, losses occur, which suppress the maximum amplitude of oscillations generated in the tank circuit. As the quantity of bulk materials becomes greater, the damping of the resonant circuit becomes greater.

Accordingly signal translation circuit 18 is arranged so that for each pass through resonance frequency a pulse is given whose height or duration depends upon the amplitude of the resonance peak $V_r$. This goes to the second input of the computer 19 to represent a signal impulse proportional to the quantity of bulk goods. Arriving on each input to computer 19 therefore during each frequency stroke are two concurrent signal pulses, from which one is proportional to the moisture quantity and the other is proportional to the bulk goods quantity. The computer 19 performs a division of the values of the two signal pulses and produces an output signal which at the reproducing apparatus 20 shows directly the percentage of moisture in the goods being monitored. Then during each frequency scan a new measurement and a new calculation is made which displays on apparatus 20 a continuing indication.

It should be understood that the output of computer 19 also can be used as a feedback control signal so that it becomes possible for example to provide a fully automatically controlled drying equipment producing a constant moisture content in the bulk goods being processed.

A special feature of the invention provides for reliable continuous and fully automatic control of moist bulk goods of many kinds without requiring that the quantity of bulk goods presented to the measuring probes be maintained at a constant value.

The calibration of the apparatus provided by this invention may be done in a conventional manner, by separating the water content through a distillation process and weighing it or determining the volume.

Also it should be understood that other means are possible that embody the principles of using the static and dynamic operational results in the measuring capacitor. For example a dynamic signal derived from the measuring capacitor may be fed back to correct the static condition of the capacitor. Also it is possible in the circuit to produce a linear relationship between the water content and the relative dielectric constant and or a nonlinear relationship between the bulk material quantity and the damping of the resonant circuit. Similarly, linearization techniques can be used in the calibration of apparatus for a predetermined kind of bulk material.

What we claim is:

1. The method of continuous measurement of the moisture content of bulk goods, comprising the steps of
    a. providing a set of capacitor plates to direct an electric field therebetween into a portion of said bulk goods as the dielectric interspersed between the plates,
    b. coupling the capacitor plates as the capacitive reactor element of a tank circuit,
    c. energizing the tank circuit with a frequency-modulated wave having a midfrequency at which said tank circuit is resonant,
    d. producing from an amplitude component of the electronic signal produced in the tank circuit a signal serving as a measure of the quantity of bulk goods, and from the bandwidth of the electronic signal produced in the tank circuit a signal serving as a measure of the moisture content of the bulk goods, and
    e. calculating from the amplitude component and the bandwidth components at said tank circuit a proportional signal indicative of the percentage of moisture in said bulk goods being measured.

2. Apparatus for continuously measuring the moisture content of bulk goods, comprising in combination,
    means presenting bulk material at a measuring zone,
    a pair of capacitor plates adjacent said measuring zone presenting a field through a quantity of bulk goods,
    a tank circuit having a particular resonance frequency bandwidth response having the capacitor formed by said plates as a part of the resonant circuit,
    a frequency-modulated oscillator having a modulation spectrum encompassing the range of said resonance response of said tank circuit,
    means deriving a signal comprising an amplitude varying signal from said tank circuit indicative of the peak signal obtained as the modulation frequency passes through resonance,
    means deriving from the tank circuit a signal comprising an indication of the bandwidth thereof,
    and means providing from a ratio of said amplitude and bandwidth signals an output measure of the percentage of moisture in the bulk goods presented at said measuring zone.

3. Apparatus as defined in claim 2 wherein the frequency-modulated oscillator includes a modulation circuit producing a carrier wave with a sawtooth mode of frequency modulation superimposed thereon.

4. Apparatus as defined in claim 2 wherein said means providing the output measure is analog computer means.

5. Apparatus as defined in claim 4 wherein the analog computer is responsive to electric input signals.

6. Apparatus as defined in claim 4 wherein the analog computer is coupled to indicating means.